US012649459B2

(12) United States Patent (10) Patent No.: US 12,649,459 B2
Tanizoe et al. (45) Date of Patent: Jun. 9, 2026

(54) PARKING ASSISTANCE DEVICE AND PARKING ASSISTANCE METHOD

(71) Applicant: Panasonic Automotive Systems Co., Ltd., Kanagawa (JP)

(72) Inventors: Yukihiro Tanizoe, Osaka Fu (JP); Takafumi Tokuhiro, Kanagawa Ken (JP); Masashi Hoshino, Tokyo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 157 days.

(21) Appl. No.: 18/650,577

(22) Filed: Apr. 30, 2024

(65) Prior Publication Data

US 2024/0278774 A1 Aug. 22, 2024

Related U.S. Application Data

(63) Continuation of application No. PCT/JP2022/045540, filed on Dec. 9, 2022.

(30) Foreign Application Priority Data

Dec. 28, 2021 (JP) ................................. 2021-213981

(51) Int. Cl.
 *G08G 1/14* (2006.01)
 *B60W 30/06* (2006.01)
 *B60W 50/14* (2020.01)
(52) U.S. Cl.
 CPC ............ *B60W 30/06* (2013.01); *B60W 50/14* (2013.01); *B60W 2050/146* (2013.01); *B60W 2554/80* (2020.02); *B60W 2556/40* (2020.02)
(58) Field of Classification Search
 CPC .................. B60W 30/06; B60W 50/14; B60W 2050/146; B60W 2554/80; B60W 2556/40; B60W 40/02; B60W 60/00; B60R 99/00

(Continued)

(56) References Cited

U.S. PATENT DOCUMENTS

2016/0075329 A1* 3/2016 Tomozawa ............ B60W 10/20
 701/41
2019/0256141 A1* 8/2019 Stroebel ............. B62D 15/0285

(Continued)

FOREIGN PATENT DOCUMENTS

JP 2011-046335 3/2011
JP 2017-052434 3/2017

(Continued)

OTHER PUBLICATIONS

International Search Report (ISR) from International Searching Authority (Japan Patent Office) in International Pat. Appl. No. PCT/JP2022/045540, dated Feb. 21, 2023, together with an English language translation.

*Primary Examiner* — Anh V La

(74) *Attorney, Agent, or Firm* — Greenblum & Bernstein, P.L.C.

(57) ABSTRACT

A parking assistance device according to the present disclosure includes a memory and a processor coupled to the memory. The processor is configured to: record a first path based on teacher traveling in which a vehicle moves from a parking position to a parking-lot-exiting position by manual driving of a driver; generate a second path for causing the vehicle to travel from a first position where the vehicle is positioned to a joining point onto the first path; and cause the vehicle to perform automated traveling from the first position to the parking position based on the first path and the second path.

20 Claims, 9 Drawing Sheets

(58) Field of Classification Search
USPC .................. 340/932.2, 435, 436, 988, 995.1
See application file for complete search history.

(56) References Cited

U.S. PATENT DOCUMENTS

| 2019/0256144 | A1 |   | 8/2019 | Yamada et al. |            |
|--------------|----|---|--------|---------------|------------|
| 2019/0270451 | A1 | * | 9/2019 | Liu           | G05D 1/0221 |
| 2021/0155239 | A1 | * | 5/2021 | Kim           | B60W 50/0098 |
| 2021/0354688 | A1 |   | 11/2021 | Tashiro et al. |          |
| 2021/0370916 | A1 |   | 12/2021 | Ishinoda      |            |
| 2021/0380097 | A1 |   | 12/2021 | Tokuhiro      |            |
| 2022/0371579 | A1 |   | 11/2022 | Tokuhiro      |            |
| 2023/0182718 | A1 |   | 6/2023 | Tokuhiro      |            |

FOREIGN PATENT DOCUMENTS

| JP | 2019-142286 | 8/2019  |
|----|-------------|---------|
| JP | 2019-182154 | 10/2019 |
| JP | 2021-124898 | 8/2021  |
| JP | 2021-126950 | 9/2021  |
| JP | 2021-187248 | 12/2021 |
| JP | 2021-191658 | 12/2021 |

* cited by examiner

PLEASE STOP ON
DISPLAYED PATH

PARKING ASSISTANCE DEVICE AND PARKING ASSISTANCE METHOD

CROSS-REFERENCE TO RELATED APPLICATIONS

This application is a continuation of International Application No. PCT/JP2022/045540, filed on Dec. 9, 2022 which claims the benefit of priority of the prior Japanese Patent Application No. 2021-213981, filed on Dec. 28, 2021, the entire contents of which are incorporated herein by reference.

FIELD

Embodiments described herein relate generally to a parking assistance device and a parking assistance method.

BACKGROUND

Conventionally, there has been known a path-memory-based automated parking technology in which a travel path is recorded based on teacher traveling by a driver and a vehicle performs automated traveling based on the recorded travel path. Conventional technologies are described in JP 2021-124898 A, for example.

The present disclosure provides a parking assistance device and a parking assistance method capable of starting automated parking from a position different from a parking-lot-exiting end position in teacher traveling.

SUMMARY

A parking assistance device according to an embodiment of the present disclosure includes a memory and a processor coupled to the memory. The processor is configured to: record a first path based on teacher traveling in which a vehicle moves from a parking position to a parking-lot-exiting position by manual driving of a driver; generate a second path for causing the vehicle to travel from a first position where the vehicle is positioned to a joining point onto the first path; and cause the vehicle to perform automated traveling from the first position to the parking position based on the first path and the second path.

DETAILED DESCRIPTION

Hereinafter, embodiments of a parking assistance device and a parking assistance method according to the present disclosure will be described with reference to the accompanying drawings.

Embodiment

Figure 1:
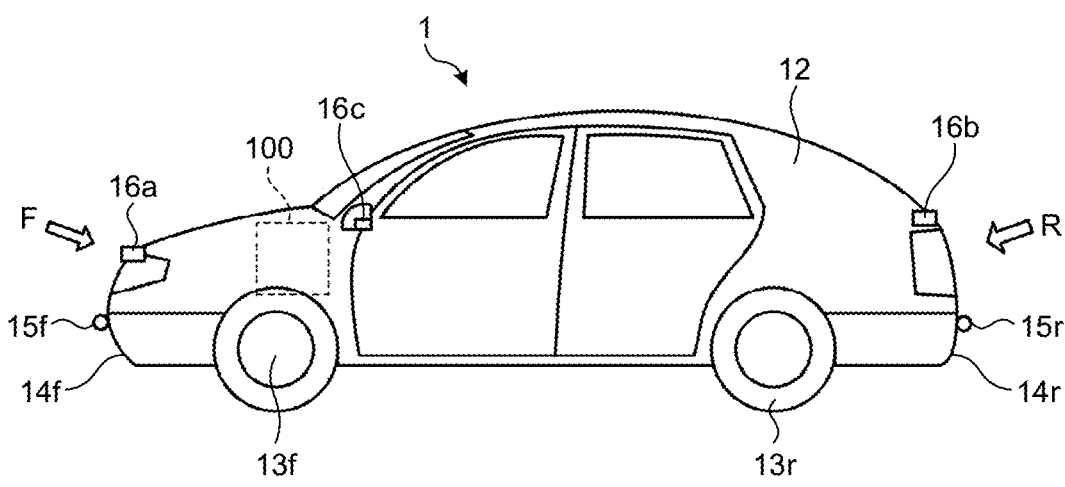
FIG. 1 is a view illustrating an example of a vehicle including a parking assistance device according to an embodiment.

FIG. 1 is a view illustrating an example of a vehicle 1 including a parking assistance device 100 according to an embodiment. As illustrated in FIG. 1, the vehicle 1 includes a vehicle body 12 and two pairs of wheels 13 disposed in a predetermined direction on the vehicle body 12. The two pairs of wheels 13 include a pair of front tires 13f and a pair of rear tires 13r.

The front tire 13f shown in FIG. 1 is an example of a first wheel in the present embodiment. The rear tire 13r is an example of a second wheel in the present embodiment. The two front tires 13f and the two rear tires 13r of the vehicle 1 are collectively referred to as wheels 13. Although the vehicle 1 illustrated in FIG. 1 includes four wheels 13, the number of wheels 13 is not limited thereto. For example, the vehicle 1 may be a two-wheeled vehicle.

The vehicle body 12 is coupled to the wheels 13 and is movable by the wheels 13. In this case, the predetermined direction in which the two pairs of wheels 13 are disposed is a traveling direction of the vehicle 1. The vehicle 1 can move forward or backward by shifting a gear (not illustrated) or the like. The vehicle 1 can also make right or left turns by steering.

The vehicle body 12 has a front end portion F which is an end portion adjacent to the front tire 13f, and a rear end portion R which is an end portion adjacent to the rear tire 13r. The vehicle body 12 has a substantially rectangular shape in top view, and four corners of the substantially rectangular shape may be referred to as end portions. Although not illustrated in FIG. 1, the vehicle 1 includes a display device, a speaker, a microphone, and an operation unit.

A pair of bumpers 14 is provided near a lower end of the vehicle body 12 at the front and rear end portions F and R of the vehicle body 12. Among the pair of bumpers 14, a front bumper 14f covers the entire front surface and parts of side surfaces in the vicinity of a lower end portion of the vehicle body 12. Among the pair of bumpers 14, a rear bumper 14r covers the entire rear surface and parts of the side surfaces in the vicinity of the lower end portion of the vehicle body 12.

Wave transmitter/receivers 15$f$ and 15$r$ that transmit and receive sound waves such as ultrasonic waves are disposed at predetermined end portions of the vehicle body 12. For example, one or more wave transmitter/receivers 15$f$ are disposed on the front bumper 14$f$, and one or more wave transmitter/receivers 15$r$ are disposed on the rear bumper 14$r$. Hereinafter, the wave transmitter/receivers 15$f$ and 15$r$ are simply referred to as a wave transmitter/receiver 15 unless otherwise distinguished. In addition, the number and positions of the wave transmitter/receivers 15 are not limited to those in the example illustrated in FIG. 1. For example, the vehicle 1 may include the wave transmitter/receivers 15 positioned on the left and right sides of the vehicle 1.

In the present embodiment, sonar using ultrasonic waves is described as an example of the wave transmitter/receiver 15, but the wave transmitter/receiver 15 may be a radar that transmits and receives electromagnetic waves. Alternatively, the vehicle 1 may include both a sonar and a radar. Further, the wave transmitter/receiver 15 may be simply referred to as a sensor.

The wave transmitter/receiver 15 detects an obstacle around the vehicle 1 based on a result of transmission and reception of sound waves or electromagnetic waves. The wave transmitter/receiver 15 measures a distance between an obstacle around the vehicle 1 and the vehicle 1 based on a result of transmission and reception of sound waves or electromagnetic waves.

In addition, the vehicle 1 includes a first in-vehicle camera 16$a$ that images an area in front of the vehicle 1, a second in-vehicle camera 16$b$ that images an area behind the vehicle 1, a third in-vehicle camera 16$c$ that images an area on the left side of the vehicle 1, and a fourth in-vehicle camera that images an area on the right side of the vehicle 1. The fourth in-vehicle camera is not illustrated.

Hereinafter, the first in-vehicle camera 16$a$, the second in-vehicle camera 16$b$, the third in-vehicle camera 16$c$, and the fourth in-vehicle camera will be simply referred to as an in-vehicle camera 16 unless otherwise distinguished. The positions and the number of in-vehicle cameras are not limited to those in the example illustrated in FIG. 1. For example, the vehicle 1 may also include only two of the first in-vehicle camera 16$a$ and the second in-vehicle camera 16$b$. Alternatively, the vehicle 1 may further include another in-vehicle camera in addition to those in the above-described example.

The in-vehicle camera 16 is capable of capturing an image of the surroundings of the vehicle 1, and is, for example, a camera that captures a color image. The captured image captured by the in-vehicle camera 16 may be a moving image or a still image. In addition, the in-vehicle camera 16 may be a camera built in the vehicle 1, a camera of a drive recorder retrofitted to the vehicle 1, or the like.

In addition, the parking assistance device 100 is mounted on the vehicle 1. The parking assistance device 100 is an information processing device that can be mounted on the vehicle 1, and is, for example, an electronic control unit (ECU) or an on board unit (OBU) provided inside the vehicle 1. Alternatively, the parking assistance device 100 may be an external device installed near a dashboard of the vehicle 1. The parking assistance device 100 may also serve as a car navigation system or the like.

The parking assistance device 100 according to the present embodiment learns a travel path based on teacher traveling by the driver, and performs parking assistance using the learning result. Such parking assistance is effective for reducing the labor of parking by the driver, for example, in a case where parking is repeatedly performed at a predetermined parking position such as a garage of a house of the driver, a contracted parking position of an apartment building, or a prescribed parking position in a parking lot of a work place or the like. Such parking assistance is called home zone parking or path-memory-based automated parking.

The vehicle 1 may include various sensors such as a gyro sensor and a wheel speed sensor (not illustrated) in addition to the configuration illustrated in FIG. 1. The gyro sensor measures a rotational behavior of the vehicle 1 such as forward, backward, left, right, and turning motions. The wheel speed sensor measures a wheel speed of each wheel 13 of the vehicle 1.

Figure 2:
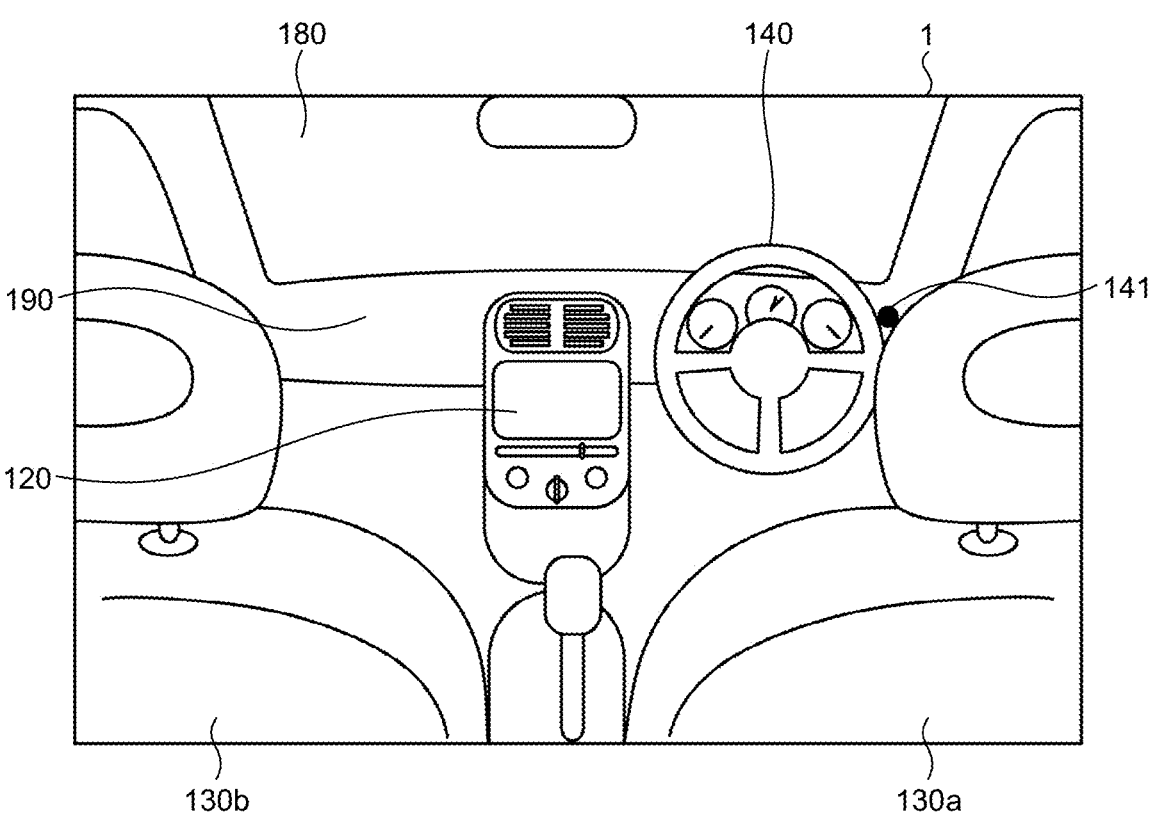
FIG. 2 is a view illustrating an example of a configuration near a driver's seat of the vehicle according to the embodiment.

Next, a configuration in the vicinity of a driver's seat of the vehicle 1 according to the present embodiment will be described. FIG. 2 is a view illustrating an example of a configuration in the vicinity of a driver's seat 130$a$ of the vehicle 1 according to the embodiment.

As illustrated in FIG. 2, the vehicle 1 includes the driver's seat 130$a$ and a passenger seat 130$b$. A windshield 180, a dashboard 190, a steering wheel 140, a display device 120, and an operation button 141 are provided in front of the driver's seat 130$a$.

The display device 120 is a display provided on the dashboard 190 of the vehicle 1. As an example, the display device 120 is positioned at the center of the dashboard 190 as illustrated in FIG. 2. The display device 120 is, for example, a liquid crystal display or an organic electro luminescence (EL) display. In addition, the display device 120 may also serve as a touch panel. The display device 120 is an example of a display unit in the present embodiment. The vehicle 1 may include a head-up display as the display unit.

The steering wheel 140 is provided in front of the driver's seat 130$a$ and can be operated by the driver. A rotation angle of the steering wheel 140, that is, a steering angle is electrically or mechanically interlocked with a change in direction of the front tire 13$f$ serving as a steering wheel. The steering wheel may be the rear tire 13$r$, or both the front tire 13$f$ and the rear tire 13$r$ may serve as the steering wheels.

The operation button 141 is a button capable of receiving a user operation. In the present embodiment, the user is, for example, the driver of the vehicle 1. The position of the operation button 141 is not limited to the example illustrated in FIG. 2, and the operation button 141 may be provided on the steering wheel 140, for example. Although one operation button 141 is illustrated in FIG. 2, a plurality of operation buttons 141 may be provided. The operation button 141 is an example of an operation unit. Furthermore, in a case where the display device 120 also serves as a touch panel, the display device 120 may be an example of the operation unit.

Next, a hardware configuration of the parking assistance device 100 will be described.

Figure 3:
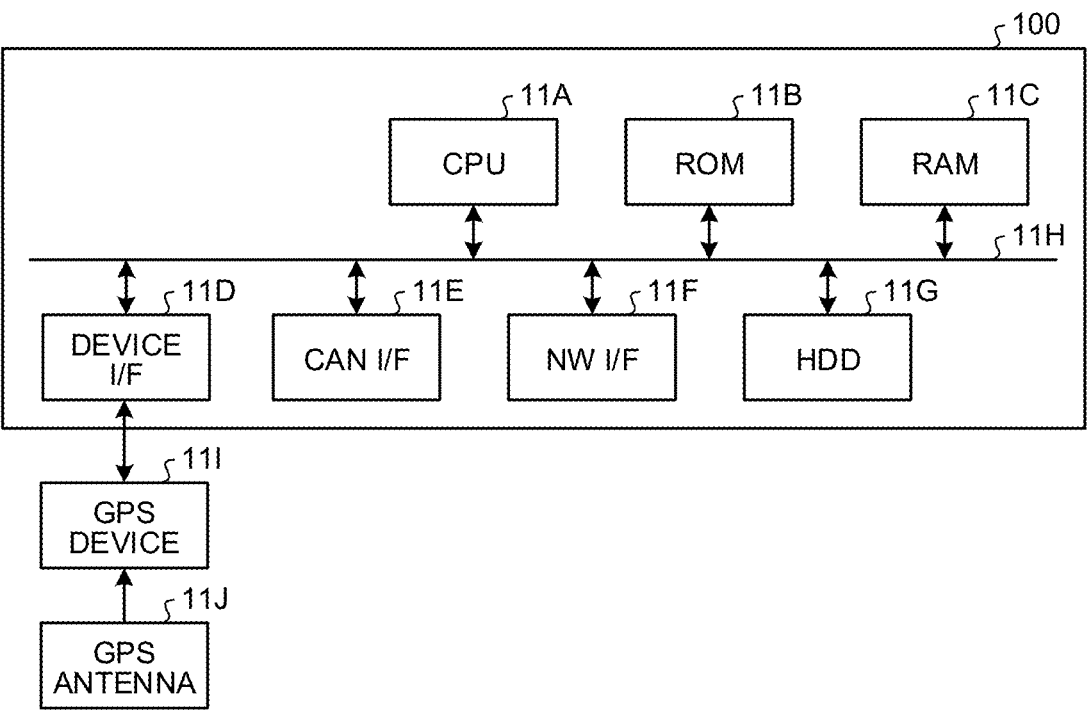
FIG. 3 is a diagram illustrating an example of a hardware configuration of the parking assistance device according to the embodiment.

FIG. 3 is a diagram illustrating an example of the hardware configuration of the parking assistance device 100 according to the embodiment. As illustrated in FIG. 3, the parking assistance device 100 includes a central processing unit (CPU) 11A, a ROM 11B, a RAM 11C, a device interface (I/F) 11D, a controller area network (CAN) I/F 11E, a network (NW) I/F 11F, a hard disk drive (HDD) 11G, and the like, which are connected to each other via a bus 11H, and has a hardware configuration using a normal computer.

The CPU 11A is an arithmetic device that controls the entire parking assistance device 100. The CPU 11A is an example of a processor in the parking assistance device 100 according to the present embodiment, and another processor or a processing circuit may be provided instead of the CPU 11A.

The ROM 11B, the RAM 11C, and the HDD 11G function as a storage unit. For example, the ROM 11B stores a program or the like that implements various types of processing executed by the CPU 11A. The RAM 11C is, for example, a main storage device of the parking assistance device 100, and stores data necessary for various types of processing executed by the CPU 11A. The parking assistance device 100 may include another non-volatile storage medium such as a flash memory instead of or in addition to the HDD 11G.

The device I/F 11D is an interface connectable to various devices. For example, the device I/F 11D is connected to a global positioning system (GPS) device 111, and acquires GPS position information indicating the current position of the vehicle 1 from the GPS device 111. The GPS position information is, for example, values of latitude and longitude indicating the absolute position of the vehicle 1.

The GPS device 111 is a device that specifies GPS coordinates representing the position of the vehicle 1 based on a GPS signal received by a GPS antenna 11J. The GPS antenna 11J is an antenna capable of receiving the GPS signal.

The device I/F 11D acquires an image, a detection result, and the like from the in-vehicle camera 16 and the wave transmitter/receiver 15. In addition, the device I/F 11D may acquire measurement results from the gyro sensor and the wheel speed sensor (not illustrated) mounted on the vehicle 1.

The CAN I/F 11E is an interface for transmitting and receiving information to and from another electronic control unit (ECU) mounted on the vehicle 1 via a CAN in the vehicle 1. Communication standards other than the CAN may be adopted.

The NW I/F 11F is a communication device capable of communicating with an information processing device outside the vehicle 1 via a network. The NW I/F 11F can communicate with the information processing device outside the vehicle 1 by, for example, a public line such as long term evolution (LTE) (registered trademark), near field communication such as Wi-Fi (registered trademark) or Bluetooth (registered trademark), or the like. A communication format between the vehicle 1 and the information processing device outside the vehicle 1 is not limited thereto. Examples of the information processing device outside the vehicle 1 include a server and a mobile terminal such as a smartphone.

In FIGS. 1 to 3, the display device 120 is illustrated as a device separate from the parking assistance device 100, but the display device 120 may be included in the parking assistance device 100.

In addition, the parking assistance device 100 may include a speaker and a microphone (not illustrated) in addition to the configuration illustrated in FIG. 3. Alternatively, the device I/F 11D of the parking assistance device 100 may input and output voice data to and from a speaker and a microphone (not illustrated) included in the vehicle 1 as devices separate from the parking assistance device 100.

Figure 4:
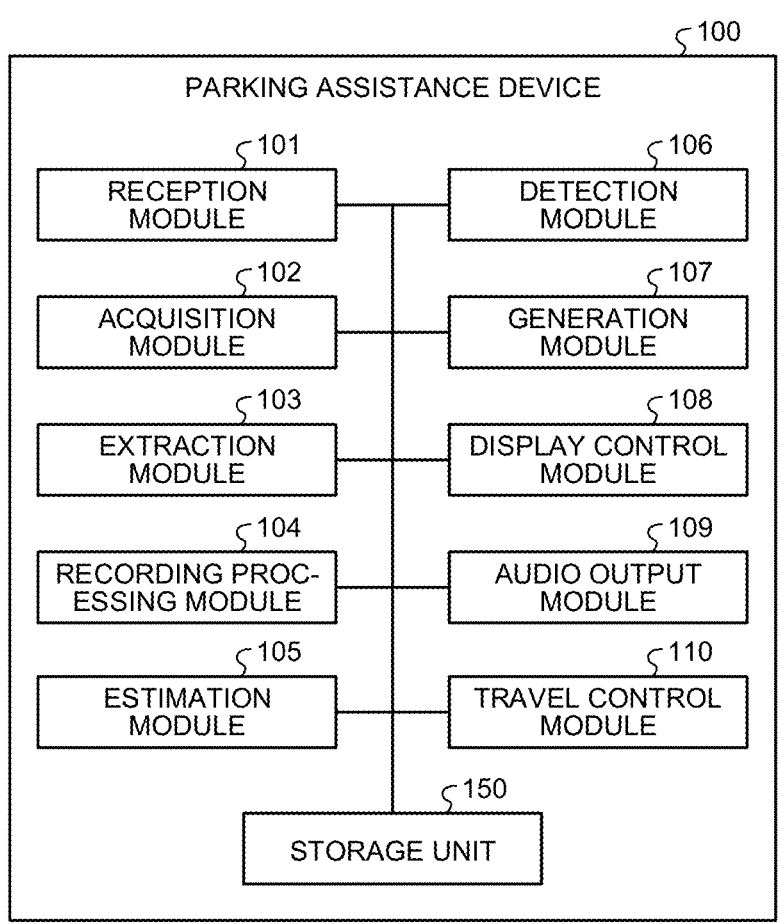
FIG. 4 is a block diagram illustrating an example of functions provided in the parking assistance device according to the embodiment.

Next, details of the functions of the parking assistance device 100 according to the present embodiment will be described. FIG. 4 is a block diagram illustrating an example of the functions provided in the parking assistance device 100 according to the embodiment.

As illustrated in FIG. 4, the parking assistance device 100 according to the present embodiment includes a reception module 101, an acquisition module 102, an extraction module 103, a recording processing module 104, an estimation module 105, a detection module 106, a generation module 107, a display control module 108, an audio output module 109, a travel control module 110, and a storage unit 150.

The storage unit 150 is implemented by, for example, the ROM 11B, the RAM 11C, or the HDD 11G. Although FIG. 4 illustrates that one storage unit 150 is included in the parking assistance device 100, a plurality of storage media may function as the storage unit 150.

The storage unit 150 stores a program and data used in various types of processing executed by the parking assistance device 100. For example, the program executed by the parking assistance device 100 according to the present embodiment has a module configuration including the above-described functional units (the reception module 101, the acquisition module 102, the extraction module 103, the recording processing module 104, the estimation module 105, the detection module 106, the generation module 107, the display control module 108, the audio output module 109, and the travel control module 110), and as actual hardware, the CPU 11A reads the program from the storage unit 150 and executes the program, whereby the above-described units are loaded onto the RAM 11C, and the reception module 101, the acquisition module 102, the extraction module 103, the recording processing module 104, the estimation module 105, the detection module 106, the generation module 107, the display control module 108, the audio output module 109, and the travel control module 110 are generated on the RAM 11C. Processing implemented by each functional unit of the parking assistance device 100 is also referred to as a step.

The program executed by the parking assistance device 100 according to the present embodiment may be a file in an installable format or an executable format, and may be provided by being recorded on a computer-readable recording medium such as a flash memory, a CD-ROM, a flexible disk (FD), a CD-R, or a digital versatile disk (DVD).

Further, the program executed by the parking assistance device 100 according to the present embodiment may be stored on a computer connected to a network such as the Internet and be provided by being downloaded via the network. Further, the program executed by the parking assistance device 100 according to the present embodiment may be provided or distributed via a network such as the Internet. In addition, the program executed by the parking assistance device 100 according to the present embodiment may be provided by being incorporated in the ROM 11B or the like in advance.

The reception module 101 receives various operations from the user. For example, in a case where the operation button 141 or an image button on the touch panel is pressed, the reception module 101 receives a user operation of starting parking assistance.

Furthermore, the reception module 101 may receive various user operations by a voice of the user input from the microphone provided in the vehicle 1.

The acquisition module 102 acquires, from the plurality of in-vehicle cameras 16a to 16c, a plurality of images obtained by imaging the surroundings of the vehicle 1 in time series as the vehicle 1 moves. Since the images are images obtained by capturing the surroundings of the vehicle 1, the images are referred to as surrounding images in the present embodiment.

The acquisition module 102 also acquires information regarding a distance between an object around the vehicle 1 and the vehicle 1. The information regarding the distance between the object around the vehicle 1 and the vehicle 1 is, for example, the presence or absence of an obstacle detected by the wave transmitter/receiver 15 and the distance between the detected obstacle around the vehicle 1 and the vehicle 1. The presence or absence of the obstacle detected by the wave transmitter/receiver 15, the distance between the obstacle around the vehicle 1 and the vehicle 1 measured by the wave transmitter/receiver 15, and the surrounding image may be referred to as environment information regarding an environment around the vehicle 1. The environment information is not limited to these pieces of information.

In addition, the acquisition module 102 acquires the GPS position information from the GPS device 111 via the device I/F 11D.

The acquisition module 102 acquires vehicle information of the vehicle 1 from various sensors or other ECUs of the vehicle 1. The vehicle information includes, for example, information regarding a speed, a steering angle, and a braking operation of the vehicle 1. Each piece of information included in the vehicle information of the vehicle 1 is stored in the storage unit 150 in association with a time when each piece of information is detected. The vehicle information of the vehicle 1 may further include a wheel speed, a rotation speed of the wheels 13, an acceleration of the vehicle 1 measured by the gyro sensor or the like, and the like.

The extraction module 103 extracts a feature point around the vehicle 1 from the surrounding image obtained by imaging the surroundings of the vehicle 1 by the in-vehicle camera 16 or a result of sensing the surroundings of the vehicle 1 by the wave transmitter/receiver 15. A method of extracting the feature point by the extraction module 103 is not particularly limited, and a known method may be applied. For example, the extraction module 103 extracts the feature point by a method such as features from accelerated segment test (FAST) or oriented FAST and rotated BRIEF (ORB). Furthermore, at the time of learning of a travel path 81, the extraction module 103 may preferentially record a feature point that satisfies a prescribed condition among the extracted feature points. For example, among a plurality of surrounding images continuous in time series, a feature point extracted from a surrounding image where the vehicle 1 has moved a longer distance during imaging may be preferentially selected as the feature point.

The recording processing module 104 records the travel path of the vehicle 1 in the teacher traveling by the driver. For example, the recording processing module 104 estimates the position of the vehicle 1 during the teacher traveling based on a change in feature point extracted by the extraction module 103 and the vehicle information of the vehicle 1, and specifies the travel path from a time-series change in position of the vehicle 1.

More specifically, the recording processing module 104 specifies the change in position of the vehicle 1 based on the time-series change in feature point extracted during the teacher traveling. Furthermore, the recording processing module 104 may correct the position of the vehicle 1 specified from the feature point based on the acquired vehicle information. In addition, the recording processing module 104 may estimate the position of the vehicle 1 during the teacher traveling from a change in absolute position of the vehicle 1 based on the GPS position information of the vehicle 1.

In the present embodiment, information in which a travel path for automated traveling, and the speed, the steering angle, the braking operation, and the feature point extracted during the teacher traveling of the vehicle 1 traveling on the travel path are associated in time series are referred to as travel path information. Since the travel path of the vehicle 1 is defined by the travel path information, processing of collecting the travel path information is processing of recording the travel path of the vehicle 1. The recording processing module 104 stores the travel path information in the storage unit 150. The travel path information is used by the travel control module 110 during automated traveling described later. A travel path recording method and the definition of the travel path information are not limited to those in the example.

In addition, the recording processing module 104 defines the environment around the vehicle 1 as map information based on the feature point extracted from the surrounding image captured during the teacher traveling, and stores the map information in the storage unit 150. The processing of recording the travel path based on the teacher traveling may be referred to as learning processing. The map information is not limited to one based on the feature point, and the recording processing module 104 may record information regarding relative positions, colors, and contours of a plurality of objects around the vehicle 1.

Figure 5:
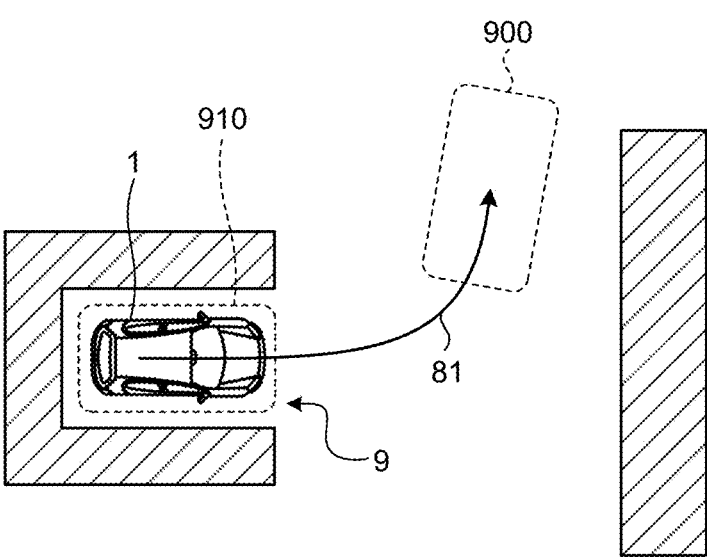
FIG. 5 is a view illustrating an example of teacher traveling according to the embodiment.

FIG. 5 is a view illustrating an example of the teacher traveling according to the embodiment. In general, in a case of manual driving, exiting from a parking lot is easier than entering a parking lot. Therefore, in a case of the vehicle 1 that performs path-memory-based automated parking, the vehicle 1 may be caused to exit from a parking lot 9 in the teacher traveling, and the vehicle 1 may be caused to enter the parking lot 9 by reversing the path of the teacher traveling at the time of operation.

In the example illustrated in FIG. 5, the driver of the vehicle 1 causes the vehicle 1 to travel from a parking position 910 to a parking-lot-exiting position 900 in the parking lot 9 by manual driving. The parking-lot-exiting position 900 is an end position of the travel path 81 of the teacher traveling. The recording processing module 104 records the travel path 81 in the teacher traveling. In addition, the recording processing module 104 records the map information based on the feature point around the travel path 81. The travel path 81 is an example of a first path in the present embodiment.

Figure 6:
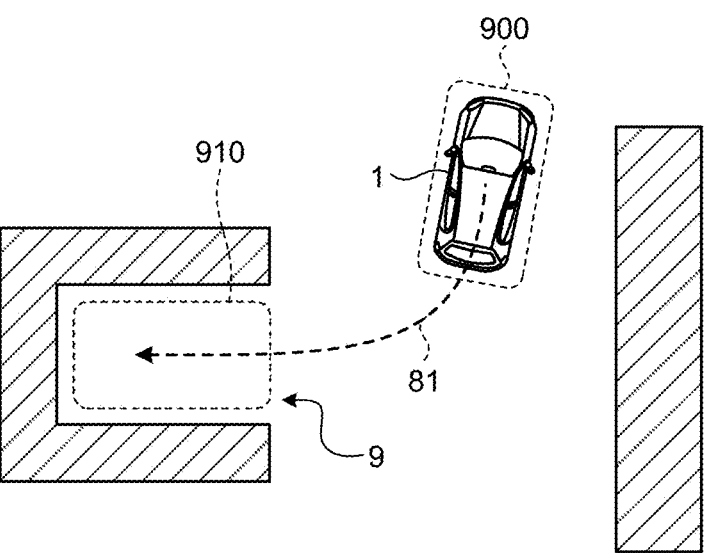
FIG. 6 is a view illustrating an example of reversal of a travel path according to the embodiment.

FIG. 6 is a view illustrating an example of reversal of the travel path 81 according to the embodiment. During the operation of the parking assistance, the travel control module 110 described below moves the vehicle 1 from the parking-lot-exiting position 900 to a parking position 910 by causing the vehicle 1 to perform automated traveling in a direction opposite to that during the teacher traveling along the travel path 81 recorded in the parking-lot-exiting operation illustrated in FIG. 5. The parking-lot-exiting position 900 is the end position of the travel path 81 at the time of the teacher traveling, but is a start position of the travel path 81 at the time of the parking assistance.

The driver of the vehicle 1 may perform the teacher traveling to cause the vehicle 1 to enter the parking lot 9. In this case, the recording processing module 104 records the travel path along which the vehicle 1 travels from a travel start position outside the parking lot 9 to the parking position 910 in the parking lot 9.

In the present embodiment, in a case where the parking assistance device 100 is switched to a learning mode by the driver, the recording processing module 104 performs the teacher traveling. The switching to the learning mode is performed, for example, by the driver operating the operation button 141 or the touch panel.

Returning to FIG. 4, the estimation module 105 estimates the position and direction of the vehicle 1 based on the feature point extracted by the extraction module 103 when the vehicle 1 performs automated traveling based on the travel path 81 by the travel control module 110 described below and the map information recorded during the teacher traveling.

For example, the estimation module 105 estimates the position of the vehicle 1 by comparing the feature point of the surrounding image captured by the in-vehicle camera 16 during the teacher traveling with the feature point of the current surrounding image. A method of estimating the position and direction of the vehicle 1 by the estimation module 105 is not limited to this example. Further, the estimation module 105 may correct the estimated position of the vehicle 1 based on the absolute position of the vehicle 1 based on the GPS position information of the vehicle 1.

The detection module 106 detects an object around the vehicle 1. More specifically, the detection module 106 detects an object around the vehicle 1 based on the presence or absence of an obstacle detected by the wave transmitter/receiver 15 acquired by the acquisition module 102, a distance between the obstacle around the vehicle 1 and the vehicle 1 measured by the wave transmitter/receiver 15, and the environment information such as the surrounding image before the start of automated traveling by the parking assistance and during automated traveling. In the present embodiment, the object includes other vehicles, buildings, trees, people, and the like.

The generation module 107 generates an additional path for causing the vehicle 1 to travel from the current position of the vehicle 1 to a joining point on the travel path 81 recorded during the teacher traveling based on the result of estimating the position and direction of the vehicle 1 by the estimation module 105.

The current position of the vehicle 1 is an example of a first position in the present embodiment. In addition, the additional path generated by the generation module 107 is an example of a second path in the present embodiment.

Figure 7:
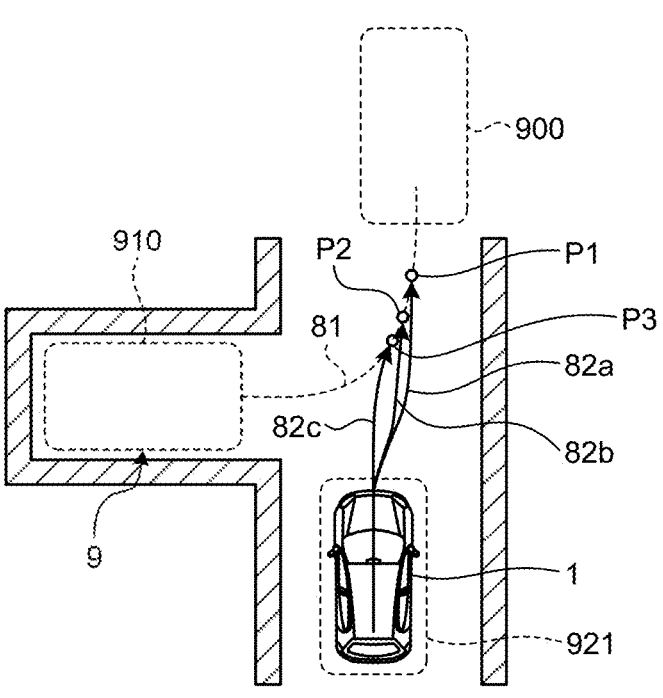
FIG. 7 is a view illustrating an example of an additional path according to the embodiment.

FIG. 7 is a view illustrating an example of additional paths 82a to 82c according to the embodiment. In the example illustrated in FIG. 7, a current position 921 of the vehicle 1 is positioned on the front side of the parking lot 9. In general, the driver of the vehicle 1 may desire to start automated parking from a position where the parking position 910 can be visually recognized, such as the current position 921 of the vehicle 1 illustrated in FIG. 7.

On the other hand, the parking-lot-exiting position 900 as the start position of the travel path 81 is positioned opposite to the current position 921 of the vehicle 1 across the parking lot 9. In a case of starting automated parking from the parking-lot-exiting position 900, the driver moves the vehicle 1 from the current position 921 to the parking-lot-exiting position 900 by manual driving.

Therefore, the generation module 107 according to the present embodiment generates the additional paths 82a to 82c that can join the travel path 81 from the current position 921 so that automated parking can be started without the need for the driver to move the vehicle 1 from the current position 921 to the parking-lot-exiting position 900 by manual driving. Hereinafter, the individual additional paths 82a to 82c will be simply referred to as an additional path 82 unless otherwise distinguished. In addition, individual joining points P1 to P3 at which the vehicle 1 joins the travel path 81 on the additional paths 82a to 82c are simply referred to as a joining point P unless otherwise distinguished.

The generation module 107 generates the additional path 82 that satisfies the prescribed condition based on the environment around the vehicle 1 and a characteristic of the vehicle 1.

The environment around the vehicle 1 is, for example, the position of an obstacle around the vehicle 1.

Examples of the characteristic of the vehicle 1 include the size of the vehicle body 12 of the vehicle 1 and a steering characteristic.

The prescribed condition includes, for example, a condition that a distance between the vehicle 1 traveling on the travel path 81 and an obstacle around the vehicle 1 is equal to or greater than a prescribed distance, and a condition that a turning radius of the vehicle 1 on the additional path 82 is equal to or greater than the minimum turning radius of the vehicle 1.

In addition, the generation module 107 may generate the additional path 82 according to a setting of whether or not to allow dry steering. Furthermore, the generation module 107 may generate the additional path 82 according to a definition of the maximum acceleration and the maximum jerk.

For example, the prescribed condition may include at least one of a condition that the additional path 82 does not include the dry steering in a case where the dry steering is not allowed for the vehicle, a condition that the acceleration of the vehicle 1 on the additional path 82 is equal to or less than a prescribed acceleration, and a condition that the jerk of the vehicle 1 on the additional path 82 is equal to or less than a prescribed jerk.

The prescribed distance between the vehicle 1 and the obstacle around the vehicle 1, the minimum turning radius, the setting of whether or not to allow the dry steering, the prescribed maximum acceleration, and the prescribed maximum jerk may be predetermined as the characteristics of the vehicle 1 or may be set by the user.

In addition, the generation module 107 generates the additional path 82 on which the vehicle 1 can move from the current position 921 to the joining point P on the travel path 81 in one stroke as much as possible. In addition, in a case where the plurality of additional paths 82a to 82c satisfying the prescribed condition can be generated, the generation module 107 adopts an additional path 82 with the smallest number of steering turns.

For example, in the example illustrated in FIG. 7, the generation module 107 can generate the plurality of additional paths 82a to 82c that satisfy the prescribed condition and can move the vehicle 1 from the current position 921 to the joining points P1 to P3 on the travel path 81. In this case, the generation module 107 adopts a path with the smallest number of steering turns among the plurality of additional paths 82a to 82c. In addition, in a case where the numbers of steering turns of the plurality of additional paths 82a to 82c are the same, the generation module 107 adopts a path that can most smoothly move the vehicle 1 from the current position 921 to the joining point P among the additional paths 82a to 82c. For example, it is assumed that the smaller the change in steering angle per unit time, the smoother the path. An index for evaluating the smoothness of the path is not limited thereto.

In addition, the generation module 107 does not generate the additional path 82 in a case where the direction of the vehicle 1 is not a direction in which the vehicle 1 can join the travel path 81 from the current position 921 of the vehicle 1. More specifically, the generation module 107 estimates a direction of the vehicle 1 at any point on the travel path 81 in a case where the vehicle 1 has moved from the current position 921 of the vehicle 1 to the point. The direction is referred to as a first direction. In addition, the direction of the vehicle 1 at the point in the teacher traveling is referred to as a second direction. Then, the generation module 107 can generate the additional path 82 in a case where a difference between the first direction and the second direction is equal to or smaller than a prescribed threshold. In addition, the generation module 107 does not generate the additional path 82 in a case where the difference between the first direction and the second direction is larger than the prescribed threshold. The prescribed threshold is not particularly limited, and is defined by the steering characteristic of the vehicle 1, a distance to a surrounding obstacle, or the like.

Figure 8:
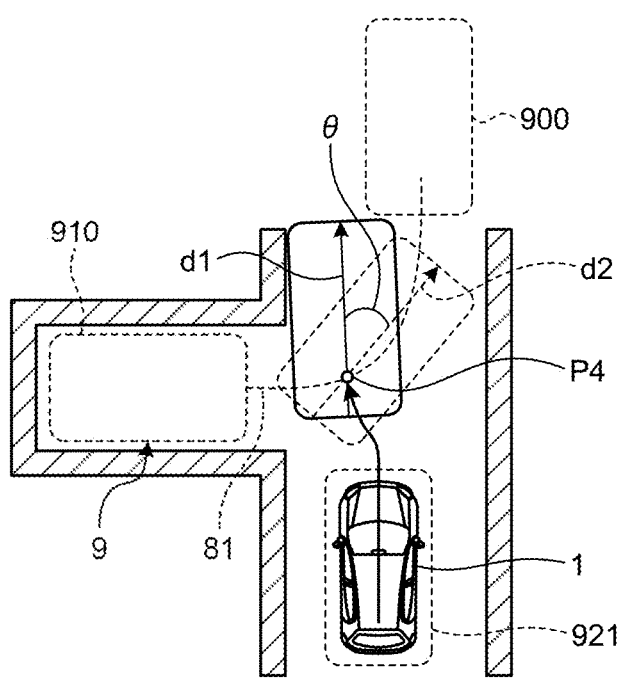
FIG. 8 is a view illustrating an example of a difference between a first direction and a second direction according to the embodiment.

FIG. 8 is a view illustrating an example of the difference between the first direction and the second direction according to the embodiment. Here, it is assumed that a direction of the vehicle 1 in a case where the vehicle 1 has moved from the current position 921 to a point P4 on the travel path 81 is a first direction d1. In addition, it is assumed that a direction of the vehicle 1 at the point P4 in a case where the vehicle 1 has traveled on the travel path 81 in the teacher traveling is a second direction d2. An angle θ formed by the first direction d1 and the second direction d2 is a difference between the first direction d1 and the second direction d2.

In a case where there is a point P4 where the angle θ formed by the first direction d1 and the second direction d2 is equal to or smaller than a prescribed threshold, the generation module 107 can generate the additional path 82. For example, even in a case where the angle θ formed by the first direction d1 and the second direction d2 is larger than the prescribed threshold at the point P4 illustrated in FIG. 8, when there is another point where the angle θ formed by the first direction d1 and the second direction d2 is equal to or smaller than the prescribed threshold from the current position 921, the generation module 107 can generate the additional path 82.

Figure 9:
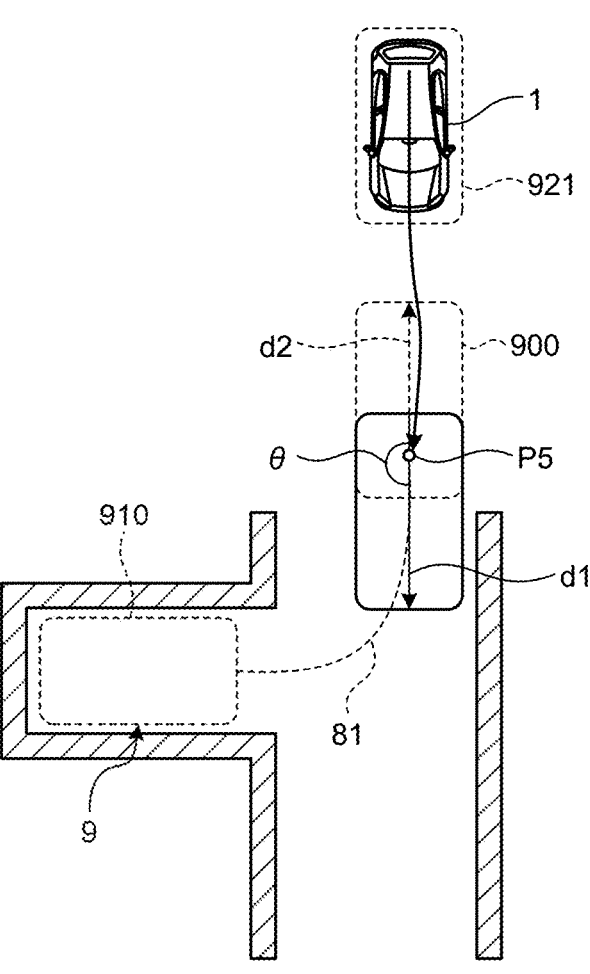
FIG. 9 is a view illustrating another example of the difference between the first direction and the second direction according to the embodiment.

FIG. 9 is a view illustrating another example of the difference between the first direction and the second direction according to the embodiment. FIG. 9 illustrates a case where the vehicle 1 approaches the parking lot 9 from a direction opposite to the direction of the vehicle 1 at the parking-lot-exiting position 900 during the teacher traveling. In this case, for example, an angle θ formed by the first direction d1 of the vehicle 1 when the vehicle 1 has moved from the current position 921 to a point P5 on the travel path 81 and the second direction d2 of the vehicle 1 at the point P5 in the teacher traveling becomes close to 180°. In the positional relationship illustrated in FIG. 9, since there is no other point where the angle θ formed by the first direction d1 and the second direction d2 is equal to or smaller than the prescribed threshold on the travel path 81, the generation module 107 does not generate the additional path 82.

In FIGS. 8 and 9, a reference point of the position of the vehicle 1 is the midpoint between the two rear tires 13r of the vehicle 1, but the reference point of the position of the vehicle 1 is not limited thereto.

Returning to FIG. 4, in a case where the vehicle 1 is at a position where the parking assistance is available while the vehicle 1 is traveling, the display control module 108 causes the display device 120 to display a notification that the parking assistance is available for the driver. For example, in a case where the generation module 107 can generate the additional path 82 from the current position 921 of the vehicle 1, the display control module 108 causes the display device 120 or the head-up display to display the notification that the parking assistance is available.

The audio output module 109 causes the speaker provided in the vehicle 1 to output sound or voice. For example, in a case where the vehicle 1 is at a position where the parking assistance is available while the vehicle 1 is traveling, the audio output module 109 may cause the speaker to output a voice message to notify the driver that the parking assistance is available.

The travel control module 110 causes the vehicle 1 to perform automated traveling from the current position 921 to the parking position 910 based on the travel path 81 and the additional path 82. The processing is referred to as automated parking. For example, the travel control module 110 controls steering, braking, and acceleration/deceleration of the vehicle 1 to cause the vehicle 1 to perform automated traveling along the travel path 81 and the additional path 82.

During the automated traveling by the travel control module 110, the driver may be seated on the driver's seat 130a of the vehicle 1 or may get off the vehicle 1.

Although FIG. 4 illustrates that the parking assistance device 100 includes the travel control module 110, the travel control module 110 may be implemented by another ECU different from the parking assistance device 100.

Next, a flow of parking assistance processing executed by the parking assistance device 100 according to the present embodiment configured as described above will be described.

Figure 10:
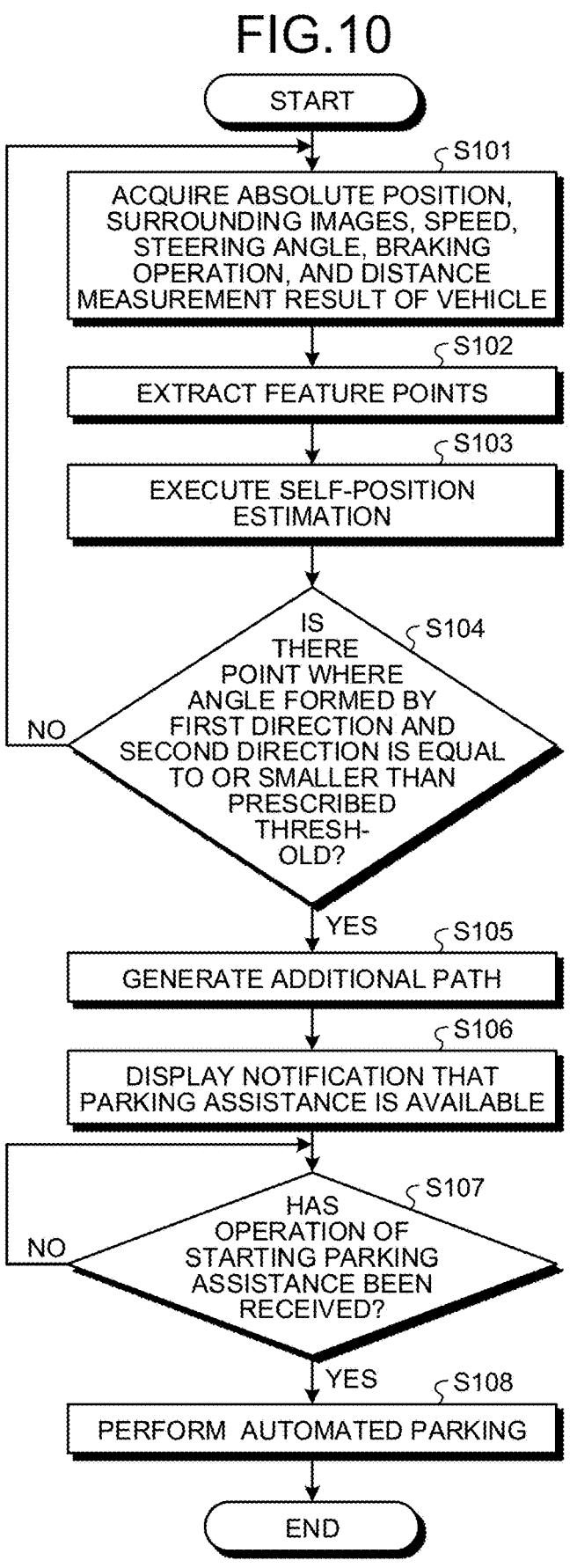
FIG. 10 is a flowchart illustrating an example of a flow of parking assistance processing executed by the parking assistance device according to the embodiment.

FIG. 10 is a flowchart illustrating an example of the flow of the parking assistance processing executed by the parking assistance device 100 according to the embodiment. It is assumed that the travel path 81 based on the teacher traveling has been registered at a time point when the processing of this flowchart is executed.

First, the acquisition module 102 acquires the absolute position, the surrounding images, the speed, the steering angle, the braking operation, and a distance measurement result of the vehicle 1 (S101). Although not illustrated in the flowchart, it is assumed that the acquisition of the absolute position, the surrounding image, the speed, the steering angle, the braking operation, and the distance measurement result of the vehicle 1 by the acquisition module 102 continues during the execution of the flowchart.

Then, the extraction module 103 extracts the feature points from the plurality of acquired surrounding images (S102).

The estimation module 105 executes self-position estimation processing of estimating the position of the vehicle 1 by comparing the extracted feature points with the feature point of the surrounding image captured by the in-vehicle camera 16 during the teacher traveling (S103). Furthermore, the estimation module 105 may execute the self-position estimation processing based on the distance measurement result acquired from the wave transmitter/receiver 15, the GPS position information acquired from the GPS device 111, or the like.

The estimation module 105 determines whether or not there is a point on the travel path 81 where the angle θ formed by the first direction d1 of the vehicle 1 in a case where the vehicle 1 has moved from the current position 921 to any point on the travel path 81 and the second direction d2 of the vehicle 1 at the point in the teacher traveling is equal to or smaller than the prescribed threshold based on the self-position estimation result (S104). In a case where there is no point on the travel path 81 where the angle θ formed by the first direction d1 and the second direction d2 is equal to or smaller than the prescribed threshold ("No" in S104), the processing returns to S101. In this case, the processing of S101 to S103 are repeated until the vehicle 1 continues to move by manual driving and a point where the angle θ formed by the first direction d1 and the second direction d2 is equal to or smaller than the prescribed threshold is on the travel path 81.

In a case where there is a point on the travel path 81 where the angle θ formed by the first direction d1 and the second direction d2 is equal to or smaller than the prescribed threshold ("Yes" in S104), the generation module 107 generates the additional path 82 (S105).

Then, the display control module 108 causes the display device 120 to display the notification that the parking assistance is available (S106). Furthermore, at this time, the display control module 108 may display, on the display device 120, an image button capable of receiving the user operation of starting the parking assistance.

Then, for example, in a case where the image button displayed on the display device 120 is pressed by the user, the reception module 101 receives the operation of starting the parking assistance ("Yes" in S107). In a case where the reception module 101 has not received the operation of starting the parking assistance ("No" in S107), the automated parking is not started, and a standby state is set.

In a case where the operation of starting the parking assistance has been received, the travel control module 110 moves the vehicle 1 from the current position 921 to the parking position 910 along the additional path 82 and the travel path 81 by the automated parking (S108). Here, the processing of the flowchart ends.

As described above, the parking assistance device 100 according to the present embodiment generates the additional path 82 for causing the vehicle 1 to travel from the current position 921 of the vehicle 1 to the joining point P on the travel path 81 based on the parking-lot-exiting operation during the teacher traveling, and causes the vehicle 1 to perform automated traveling from the current position 921 to the parking position 910 based on the generated additional path and the travel path 81. Therefore, with the parking assistance device 100 according to the present embodiment, the automated parking can be started from a position different from the parking-lot-exiting end position in the teacher traveling.

That is, with the parking assistance device 100 according to the present embodiment having such a configuration, the degree of freedom of a start position of the automated parking can be improved, and the convenience of the user can be improved.

In addition, the parking assistance device 100 according to the present embodiment can generate the additional path 82 capable of smoothly joining the travel path 81 from the current position 921 of the vehicle 1 by providing the prescribed conditions regarding the turning radius, whether or not to allow the dry steering, the acceleration, the jerk, and the number of steering turns of the vehicle 1 in the additional path 82. In a case where the user is in the vehicle 1 at the time of the automated parking, the smooth additional path 82 can reduce the user's feeling of stress in the automated traveling.

First Modification

In the above-described embodiment, the parking assistance device 100 has been described as generating the additional path 82 at the time of the automated parking. Further, the parking assistance device 100 may record the generated additional path 82 and use the same for the next and subsequent automated parking.

For example, when the vehicle 1 performs automated traveling based on the travel path 81 and the additional path 82 by the travel control module 110, the recording processing module 104 records a path of the automated traveling as a combined path having the current position 921 of the vehicle 1 at the time of generating the additional path 82 as a start point and the parking position 910 as an end point. The combined path is an example of a third path in the present modification.

In addition, the recording processing module 104 records a feature point around the combined path as the map information. The combined path and the map information to which the feature point is added are stored in the storage unit 150.

The generation module 107 generates an additional path for causing the vehicle 1 to travel from the current position of the vehicle 1 to a joining point on the combined path at the time of automated parking performed subsequent to the automated traveling during which the combined path is recorded.

Figure 11:
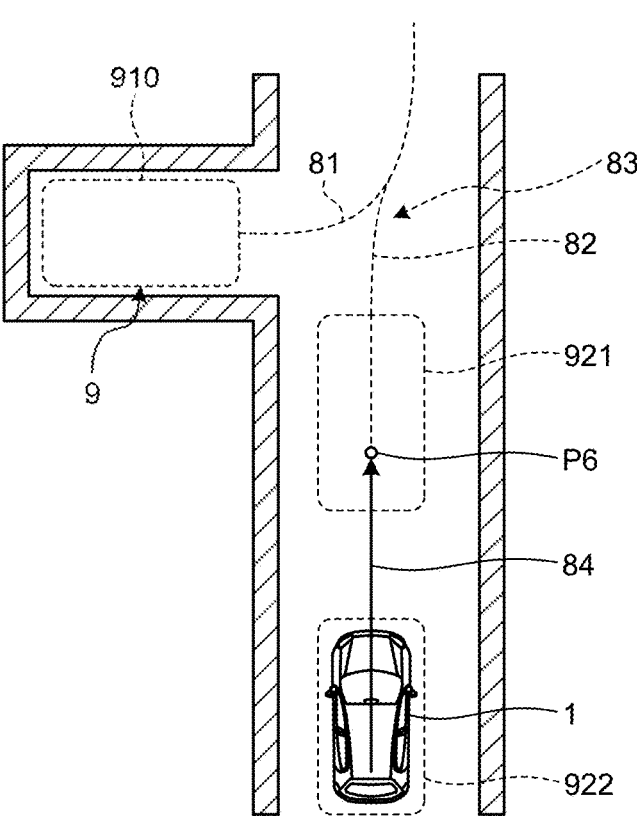
FIG. 11 is a view illustrating an example of an additional path according to a first modification.

FIG. 11 is a view illustrating an example of the additional path according to the first modification. In the example illustrated in FIG. 11, it is assumed that a combined path 83 in which the travel path 81 during the teacher traveling and the additional path 82 generated in the previous automated parking are combined is registered in the previous automated parking.

The estimation module 105 estimates the position and direction of the vehicle 1 based on the feature point extracted by the extraction module 103 and the map information recorded together with the additional path 82.

The generation module 107 generates an additional path 84 for causing the vehicle 1 to travel from a current position 922 of the vehicle 1 to a joining point P6 on the combined path 83 based on a result of estimating the position and direction of the vehicle 1 by the estimation module 105.

As illustrated in FIG. 11, the current position 922 at this time is farther from the travel path 81 based on the teacher traveling than the current position 921 of the vehicle 1 at the time of generating the combined path 83. That is, the generation module 107 can expand an area that can be set as a start point of the additional path 84 than at the time of generating the combined path 83.

The current position 922 of the vehicle 1 at the time of generating the additional path 84 this time is an example of a second position in the present modification. In addition, the additional path 84 from the current position 922 of the vehicle 1 at the time of generating the additional path 84 this time to the joining point P6 on the combined path 83 is an example of a fourth path.

The travel control module 110 causes the vehicle 1 to perform automated traveling from the current position 922 of the vehicle 1 at the time of generating the additional path 84 this time to the parking position 910 based on the combined path 83 and the additional path 84.

As described above, the parking assistance device 100 according to the present modification records the combined path 83 obtained by combining the additionally generated additional path 82 with the travel path 81 based on the teacher traveling, so that it is possible to expand the area that can be used as the start point of the additional path 84 at the time of the next or subsequent automated parking.

Note that the recording processing module 104 may record a second combined path obtained by further adding the additional path 84 this time to the combined path 83. In this case, the area that can be used as the start point of the additional path can be further expanded.

Second Modification

In the above-described embodiment, the parking assistance device 100 generates the additional path 82 having the current position 921 of the vehicle 1 as the start point, but the start point of the additional path 82 is not limited thereto.

For example, in a case where the generation module 107 cannot generate the additional path 82 that can join the travel path 81 in one stroke from the current position 921 of the vehicle 1, the display control module 108 may cause the display device 120 or the head-up display to display a notification for guiding the driver to manually move the vehicle 1 to a position where the vehicle 1 can join the travel path 81 in one stroke.

Not only when the generation module 107 cannot generate the additional path 82 that can join the travel path 81 from the current position 921 of the vehicle 1 in one stroke, but also when the additional path 82 satisfying the prescribed condition described in the above-described embodiment cannot be generated, the display control module 108 may cause the display device 120 or the head-up display to display a notification for guiding the driver to manually move the vehicle 1 to a position where the additional path 82 satisfying the prescribed condition can be generated.

Third Modification

In the above-described embodiment, in a case where the generation module 107 of the parking assistance device 100 can generate a plurality of additional paths 82 satisfying the prescribed condition, an additional path 82 having the smallest number of steering turns among the plurality of additional paths 82 is adopted, but a criterion for determining the additional path 82 is not limited thereto. For example, in a case where the generation module 107 of the parking assistance device 100 according to the present modification can generate the plurality of additional paths 82 satisfying the prescribed condition, an additional path 82 with the smallest number of turns may be adopted among the plurality of additional paths 82.

Fourth Modification

In addition, as another example of the criterion for determining the additional path 82, the generation module 107 of the parking assistance device 100 may use an evaluation score. For example, in a case where the generation module 107 can generate a plurality of additional paths 82 satisfying the prescribed condition, the evaluation score for each of the plurality of additional paths 82 may be calculated.

For example, the generation module 107 calculates the evaluation score according to at least one of calculation rules: "the smaller the number of turns in the path, the lower the evaluation score", "the smaller the curvature change rate in the path, the lower the evaluation score", "the smaller the jerk in the path, the lower the evaluation score", and "the shorter the distance of the path, the lower the evaluation score". A combination of the calculation rules may be set in advance in the parking assistance device 100 or may be selected by the user.

Then, the generation module 107 adopts an additional path 82 having the smallest evaluation score or an additional path 82 having an evaluation score equal to or lower than a prescribed threshold among the plurality of additional paths 82 satisfying the prescribed condition.

Specifically, the generation module 107 may calculate the evaluation score for all of the plurality of additional paths 82 satisfying the prescribed condition, and then adopt the additional path 82 corresponding to the smallest evaluation score among the calculated evaluation scores.

Alternatively, the generation module 107 may calculate the evaluation scores of the plurality of additional paths 82 satisfying the prescribed condition one by one, and adopt an additional path 82 corresponding to an evaluation score equal to or lower than the prescribed threshold at a stage where the evaluation score is calculated. In this case, since the generation module 107 ends the calculation of the evaluation score when the evaluation score equal to or lower than the prescribed threshold is calculated, it is not necessary to calculate the evaluation score for all of the plurality of additional paths 82 satisfying the prescribed condition, and a time for the calculation processing is reduced.

The above-described evaluation score calculation method is an example, and rules other than the exemplified calculation rules may be further combined. In addition, "the lower the evaluation score" of the calculation rule exemplified above may be changed to "the higher the evaluation score". In this case, the generation module 107 adopts an additional path 82 having the highest evaluation score or an additional path 82 having an evaluation score equal to or greater than the prescribed threshold among the plurality of additional paths 82 satisfying the prescribed condition.

Fifth Modification

In the above-described embodiment, the description has been given assuming that the generation module 107 of the parking assistance device 100 generates the additional path 82 for causing the vehicle 1 to travel from the current position of the vehicle 1 to the joining point on the travel path 81 recorded in the teacher traveling. However, the start position of the additional path does not have to completely coincide with the current position of the vehicle 1.

For example, the generation module 107 may generate a path for causing the vehicle 1 to travel backward from the joining point on the travel path 81 recorded in the teacher traveling to the vicinity of the current position of the vehicle 1. A path that starts from the vicinity of the current position of the vehicle 1 and ends at the joining point on the travel path 81 is obtained by reversing the path. Therefore, in the present modification, an end of the path near the current position of the vehicle 1 is set as the start position of the path, and the joining point on the travel path 81 is set as the end position of the path based on the reversed path. In a case where a distance between the start position of the path and the current position of the vehicle 1 and a difference between a direction of the vehicle 1 at the start position and the current direction of the vehicle 1 satisfy the condition, the generation module 107 adopts the path as the additional path.

Alternatively, the generation module 107 may generate a path passing through the vicinity of the current position of the vehicle 1 from the joining point on the travel path 81 recorded in the teacher traveling. In this case, a path that starts from a point farther from the travel path 81 than the vicinity of the current position of the vehicle 1, passes through the vicinity of the current position of the vehicle 1, and ends at the joining point on the travel path 81 is obtained by reversing the path.

Figure 12:
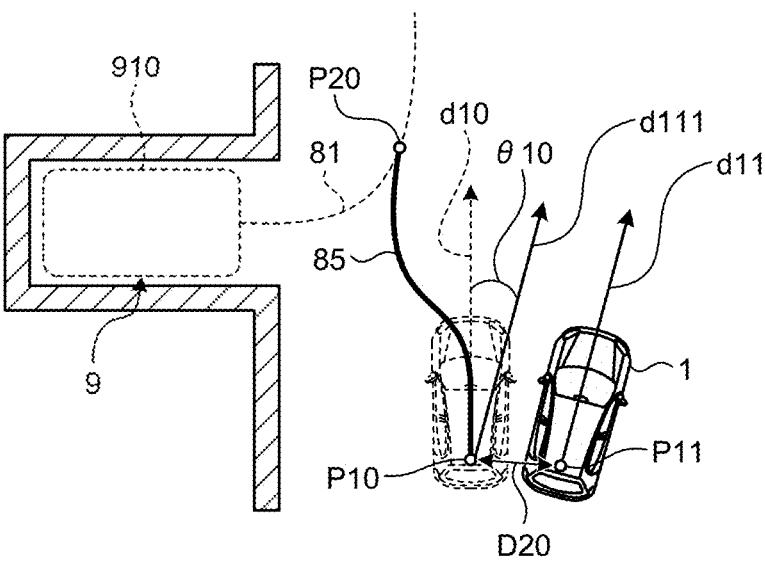
FIG. 12 is a view illustrating an example of a path generated by a generation module according to a fifth modification.

FIG. 12 is a view illustrating an example of a path 85 generated by the generation module 107 according to the fifth modification. The path 85 is an example of a fifth path in the present modification. In a case where the path 85 is adopted as the additional path, the path 85 is also an example of the second path.

In the example illustrated in FIG. 12, the generation module 107 generates the path 85 from a joining point P20 on the travel path 81 to the vicinity of a current position P11 of the vehicle 1. The path 85 is a path starting from a start position P10 and ending at the joining point P20. The start position P10 is positioned near the current position P11 of the vehicle 1. The current position P11 of the vehicle 1 is an example of a first position in the present modification. In addition, the start position P10 is an example of a third position in the present modification. The joining point P20 is not fixed in advance, but is determined by computation by the generation module 107 in such a way that the start position P10 approaches the current position P11 of the vehicle 1.

The path 85 is a path connecting the joining point P20 to the vicinity of the current position P11 of the vehicle 1 in FIG. 12, and may be a path passing through the vicinity of the current position P11 of the vehicle 1 from the joining point P20 as described above.

Then, in a case where the vehicle 1 travels on the path 85, the generation module 107 estimates a direction d10 of the vehicle 1 at the start position P10. For example, the generation module 107 estimates the direction d10 of the vehicle 1 at the start position P10 by estimating steering in a case where the vehicle 1 moves backward from the joining point P20 to the start position P10 based on a direction of the vehicle 1 at the joining point P20 on the travel path 81 during the teacher traveling and the shape of the path 85. The direction d10 is an example of a third direction in the present modification. In addition, the direction d11 of the vehicle 1 at the current position P11 of the vehicle 1 is an example of a fourth direction in the present modification.

In a case where a distance D20 between the current position P11 of the vehicle 1 and the start position P10 of the path 85 is equal to or shorter than a prescribed distance, and a difference between the direction d10 of the vehicle 1 at the start position P10 of the path 85 and the direction d11 of the vehicle 1 at the current position P11 of the vehicle 1 is equal to or smaller than a prescribed angle, the generation module 107 adopts the path 85 as the additional path. In the example illustrated in FIG. 12, in a case where an angle θ10 formed by a straight line dill obtained by moving a straight line representing the direction d11 of the vehicle 1 at the current position P11 of the vehicle 1 while maintaining a slope of the direction d11 and a straight line representing the direction d10 of the vehicle 1 is equal to or smaller than a prescribed angle, the generation module 107 determines that the difference between the direction d10 of the vehicle 1 at the start position P10 and the direction d11 of the vehicle 1 at the current position P11 of the vehicle 1 is equal to or smaller than the prescribed angle.

The prescribed distance and the prescribed angle in the present modification are not particularly limited, and may be determined according to, for example, the steering characteristic of the vehicle 1. In addition, the prescribed angle may vary depending on the distance D20 between the current position P11 and the start position P10 of the vehicle 1.

In addition, the generation module 107 may not be able to generate the path 85 in which the distance D20 is equal to or shorter than the prescribed distance and the difference between the direction d10 and the direction d11 is equal to or smaller than the prescribed angle, depending on a positional relationship between the current position P11 of the vehicle 1 and the travel path 81. In such a case, the display control module 108 according to the present modification may cause the display device 120 to display the path 85 that can be generated, and may guide the driver to move the vehicle 1 on the path 85 or to the vicinity of the path 85 by manual driving.

Figure 13:
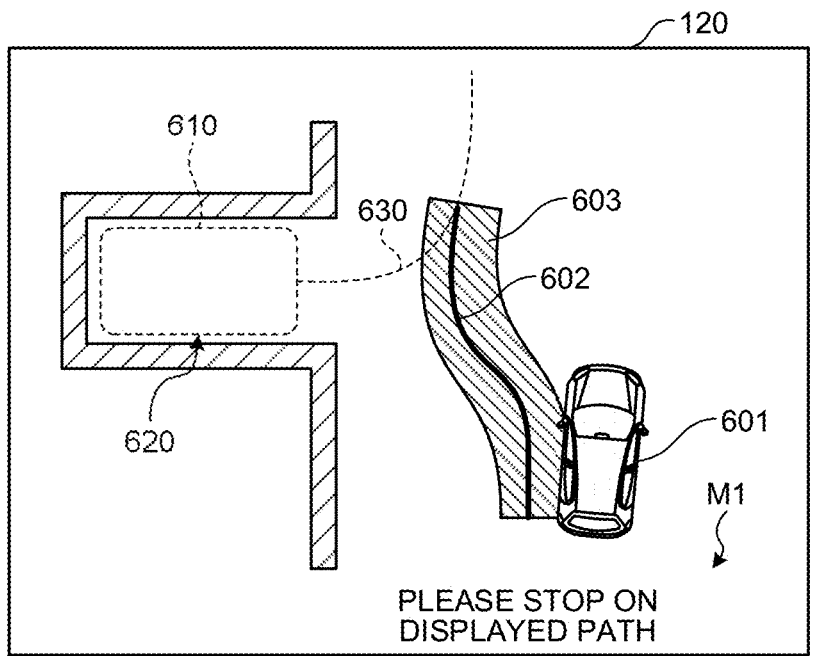
FIG. 13 is a view illustrating an example of a guidance screen according to the fifth modification.

FIG. 13 is a view illustrating an example of a guidance screen according to the fifth modification. In a case where the distance D20 is longer than the prescribed distance or the difference between the direction d10 and the direction d11 is larger than the prescribed angle, the display control module 108 causes the display device 120 to display a path image 602 representing the path 85. In addition, the display control module 108 displays a range image 603 indicating a range corresponding to the vehicle width of the vehicle 1 on both sides of the path 85. In addition, in the example illustrated in FIG. 13, as an example, a vehicle image 601 representing the vehicle 1, a travel path image 630 representing the travel path 81 recorded in the teacher traveling, a parking lot image 620 representing the parking lot 9, a parking position image 610 representing the parking position 910, and a guidance message M1 are displayed on the guidance screen. The guidance message M1 is a content that prompts the driver to move or stop the vehicle 1, for example, "please stop on the displayed path", but is not limited thereto. In addition, the audio output module 109 may cause the speaker to output the guidance message M1 by voice.

With the parking assistance device 100 according to the present modification, it is possible to generate the path 85 along which the vehicle 1 can join the travel path 81 even in a case where the additional path 82 starting from a position completely coinciding with the current position P11 of the vehicle 1 cannot be generated. In addition, with the parking assistance device 100 according to the present modification, it is possible to guide the vehicle 1 to a position where the vehicle 1 can join the travel path 81 by prompting the driver of the vehicle 1 to move the vehicle 1 even in a case where it is difficult to cause the vehicle 1 to join the travel path 81 immediately from the current position P11 of the vehicle 1.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A parking assistance device, comprising:
   a memory; and
   a processor coupled to the memory and configured to:
      record a first path based on teacher traveling in which a vehicle moves from a parking position to a parking-lot-exiting position by manual driving of a driver;
      generate a second path for causing the vehicle to travel from a first position where the vehicle is positioned to a joining point onto the first path;
      estimate a first direction of the vehicle at a point on the first path when the vehicle has moved from the first position to the point;
      determine that the second path is generatable when a difference between the first direction and a second direction of the vehicle at the point in the teacher traveling is equal to or less than a prescribed threshold; and
      cause the vehicle to perform automated traveling from the first position to the parking position based on the first path and the second path.

2. The parking assistance device according to claim 1, wherein
   the processor is configured to generate the second path satisfying a prescribed condition based on an environment around the vehicle and a characteristic of the vehicle.

3. The parking assistance device according to claim 2, wherein
the prescribed condition includes: a first condition that a distance between the vehicle traveling on the second path and an obstacle around the vehicle is equal to or greater than a prescribed distance; and a second condition that a turning radius of the vehicle on the second path is equal to or greater than a minimum turning radius of the vehicle.

4. The parking assistance device according to claim 2, wherein
the prescribed condition includes at least one of a first condition that the second path does not include dry steering when the dry steering is not allowed for the vehicle, a second condition that an acceleration of the vehicle on the second path is equal to or less than a prescribed acceleration, and a third condition that a jerk of the vehicle on the second path is equal to or less than a prescribed jerk.

5. The parking assistance device according to claim 3, wherein
the prescribed condition further includes at least one of a third condition that the second path does not include dry steering when the dry steering is not allowed for the vehicle, a fourth condition that an acceleration of the vehicle on the second path is equal to or less than a prescribed acceleration, and a fifth condition that a jerk of the vehicle on the second path is equal to or less than a prescribed jerk.

6. The parking assistance device according to claim 2, wherein
the processor is configured to set, when a plurality of paths satisfying the prescribed condition are generatable, a path with a smallest number of steering turns as the second path.

7. The parking assistance device according to claim 3, wherein
the processor is configured to set, when a plurality of paths satisfying the prescribed condition are generatable, a path with a smallest number of steering turns as the second path.

8. The parking assistance device according to claim 2, wherein
the processor is configured to set, when a plurality of paths satisfying the prescribed condition are generatable, a path with a smallest number of turns as the second path.

9. The parking assistance device according to claim 3, wherein
the processor is configured to set, when a plurality of paths satisfying the prescribed condition are generatable, a path with a smallest number of turns as the second path.

10. The parking assistance device according to claim 2, wherein
the processor is configured to calculate, when a plurality of paths satisfying the prescribed condition are generatable, an evaluation score for each of the plurality of paths, and set a path with a lowest evaluation score or a path with an evaluation score equal to or lower than a prescribed threshold among the plurality of paths as the second path.

11. The parking assistance device according to claim 3, wherein
the processor is configured to calculate, when a plurality of paths satisfying the prescribed condition are generatable, an evaluation score for each of the plurality of paths, and set a path with a lowest evaluation score or a path with an evaluation score equal to or lower than a prescribed threshold among the plurality of paths as the second path.

12. The parking assistance device according to claim 10, wherein
the processor is configured to calculate the evaluation score according to at least one of calculation rules, the calculation rules including: the smaller a number of turns in the path, the lower the evaluation score; the smaller a curvature change rate in the path, the lower the evaluation score; the smaller a jerk in the path, the lower the evaluation score; and the shorter a distance of the path, the lower the evaluation score.

13. The parking assistance device according to claim 1, wherein
the processor is configured to record, when the vehicle performs the automated traveling from the first position to the parking position based on the first path and the second path, a path of the automated traveling as a third path, and record a feature point around the third path as map information.

14. The parking assistance device according to claim 2, wherein
the processor is configured to record, when the vehicle performs the automated traveling from the first position to the parking position based on the first path and the second path, a path of the automated traveling as a third path, and record a feature point around the third path as map information.

15. The parking assistance device according to claim 13, wherein
the processor is configured to:
generate a fourth path for causing the vehicle to travel from a second position where the vehicle is later positioned to a second joining point onto the third path; and
cause the vehicle to perform automated traveling from the second position to the parking position based on the third path and the fourth path.

16. The parking assistance device according to claim 1, wherein
the processor is configured to: generate a third path that is a path from the joining point onto the first path to a second position near the first position or a path passing through the second position from the joining point; estimate a third direction of the vehicle at the second position on the third path; and adopt the third path as the second path when a distance between the first position and the second position is equal to or shorter than a prescribed distance and a second difference between the third direction and a fourth direction of the vehicle at the first position is equal to or smaller than a prescribed angle.

17. The parking assistance device according to claim 16, wherein
the processor is further configured to cause a display to display an image representing the third path when the distance between the first position and the second position is longer than the prescribed distance or the second difference between the third direction and the fourth direction is larger than the prescribed angle.

18. A parking assistance method, comprising:
recording a first path based on teacher traveling in which a vehicle moves from a parking position to a parking-lot-exiting position by manual driving of a driver;

generating a second path for causing the vehicle to travel from a first position where the vehicle is positioned to a joining point onto the first path;

estimating a first direction of the vehicle at a point on the first path when the vehicle has moved from the first position to the point;

determining that the second path is generatable when a difference between the first direction and a second direction of the vehicle at the point in the teacher traveling is equal to or less than a prescribed threshold; and causing the vehicle to perform automated traveling from the first position to the parking position based on the first path and the second path.

19. A parking assistance method, comprising:

recording a first path based on teacher traveling in which a vehicle moves from a parking position to a parking-lot-exiting position by manual driving of a driver;

generating a second path for causing the vehicle to travel from a first position where the vehicle is positioned to a joining point onto the first path; and causing the vehicle to perform automated traveling from the first position to the parking position based on the first path and the second path, wherein the second path is generated when a difference between a first direction and a second direction is equal to or less than a prescribed threshold, the first direction being a direction of the vehicle at a point on the first path when the vehicle has moved from the first position to the point, the second direction being a direction of the vehicle at the point in the teacher traveling.

20. A parking assistance method of causing a vehicle to perform automated traveling based on teacher traveling implemented by manual driving of a driver, the parking assistance method comprising:

recording a travel path based on the teacher traveling by the driver;

causing the vehicle to perform automated traveling along the travel path from a current position of the vehicle to a parking position of the travel path; and when the current position of the vehicle is apart from the travel path, and a traveling direction of the vehicle is same as a traveling direction of the vehicle at a start position of the travel path, generating a path along which the vehicle performs the automated traveling from the current position to the parking position through the start position of the travel path.

* * * * *